Figure 1:
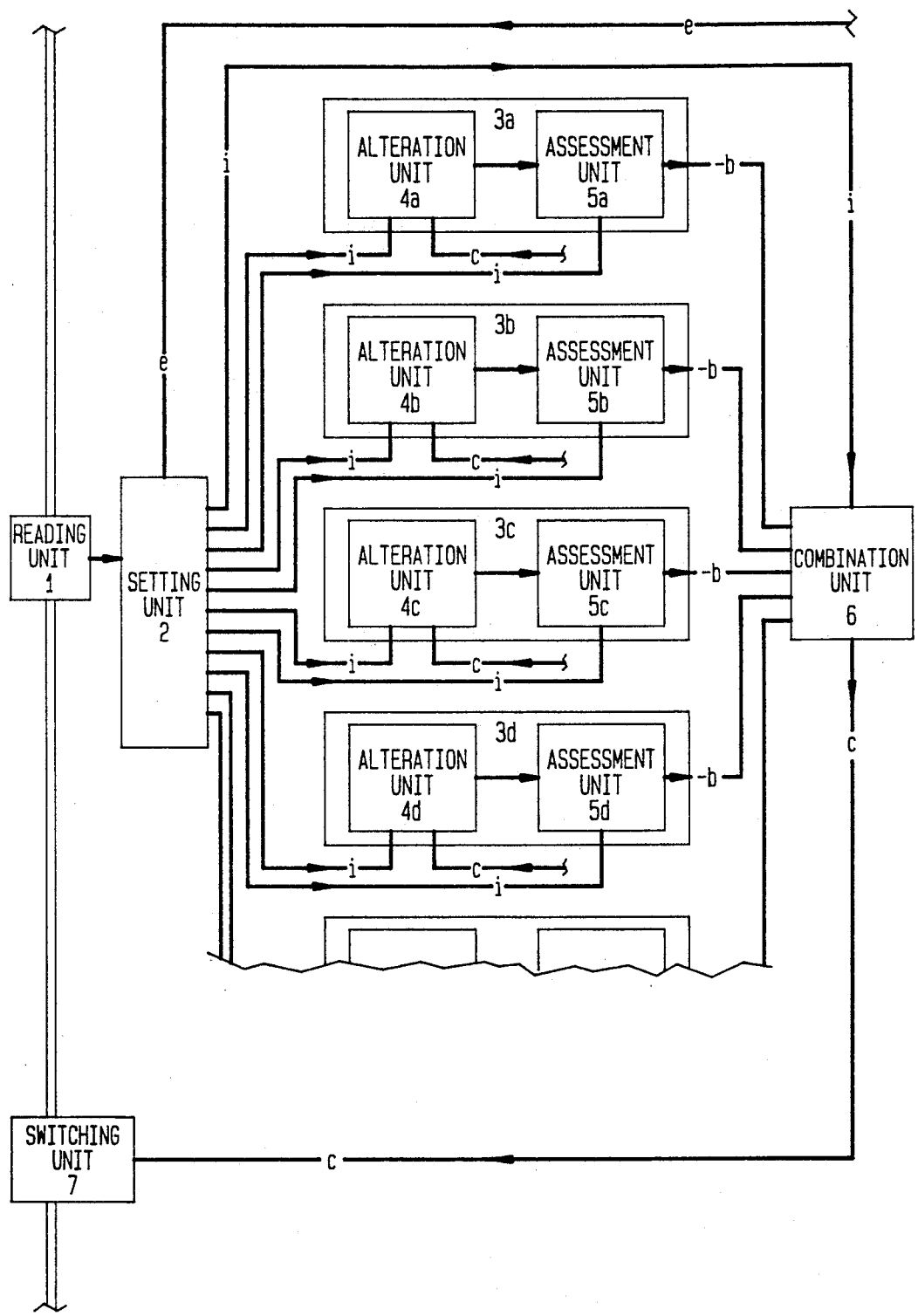

United States Patent [19]

Brandt

[11] Patent Number: 5,224,092
[45] Date of Patent: Jun. 29, 1993

[54] METHOD FOR CONTROLLING A FLOW OF DATA CELLS INTO A PLURALITY OF ASYNCHRONOUSLY TIME-DIVIDED TRANSMISSION CHANNELS WITH A SINGLE ADMISSION SWITCH FOR TRANSMISSION IN THE CHANNELS WITH REFERENCE TO THE STATE OF A PLURALITY OF COUNT VALUES

[75] Inventor: Dick Brandt, Voorburg, Netherlands

[73] Assignee: Koninklijke Ptt Nederland N.V., Groningen, Netherlands

[21] Appl. No.: 729,635

[22] Filed: Jul. 15, 1991

Related U.S. Application Data

[63] Continuation-in-part of Ser. No. 573,446, Aug. 24, 1990, abandoned.

[30] Foreign Application Priority Data

Sep. 5, 1989 [NL] Netherlands ............ 8902226

[51] Int. Cl.$^5$ .................. H04J 3/14; H04L 12/56
[52] U.S. Cl. .................... 370/17; 370/94.1; 370/13
[58] Field of Search .............. 370/17, 13, 94.1, 94.2, 370/60, 60.1

[56] References Cited

U.S. PATENT DOCUMENTS

| | | |
|---|---|---|
| 4,475,192 | 10/1984 | Fernow et al. ............ 370/94.1 |
| 4,769,810 | 9/1988 | Eckberg, Jr. et al. ........ 370/94.1 |
| 4,769,811 | 9/1988 | Eckberg, Jr. et al. ........ 370/94.1 |
| 4,896,316 | 1/1990 | Lespangnol et al. ........ 370/94.1 |
| 5,128,924 | 7/1992 | Lebihan .................. 370/13 |
| 5,138,607 | 8/1992 | Thiebaut et al. .......... 370/13 |

OTHER PUBLICATIONS

Denisen F.; Desmet, E.; Petit, G. H., "The Policing Function in an ATM Network", 1990 International Zurich Seminar on Digital Communications, Electronic Circuits and Systems for Communication, Proceedings I.E.E.E. (Cat. No. 90th0305-3), x+511 pp., pp. 31-44, 1990.

*Primary Examiner*—Douglas W. Olms
*Assistant Examiner*—Hassan Kizou
*Attorney, Agent, or Firm*—Frishauf, Holtz, Goodman & Woodward

[57] ABSTRACT

Method and device for monitoring a downstream transmission medium which comprises a multiplicity of virtual, asynchronously time-shared transmission channels via which a data flow can be transmitted. The data flow is composed of data cells comprising a control word group (header) and an information word group. The header is read out in a monitoring device. On the arrival of a data cell, a number of variables is incremented and processed to produce a corresponding number of assessment signals. Each data cell header gives an indication of those variables which have to be incremented and processed, and of the mutation (incremention) and assessment algorithms to be used in doing so. Furthermore, one or more of the assessment signals are processed in accordance with a combination algorithm, deduced from the data cell header too, to form a control signal.

6 Claims, 2 Drawing Sheets

METHOD FOR CONTROLLING A FLOW OF DATA CELLS INTO A PLURALITY OF ASYNCHRONOUSLY TIME-DIVIDED TRANSMISSION CHANNELS WITH A SINGLE ADMISSION SWITCH FOR TRANSMISSION IN THE CHANNELS WITH REFERENCE TO THE STATE OF A PLURALITY OF COUNT VALUES

This application is a Continuation-In-Part of application Ser. No. 07/573,446, filed Aug. 24, 1990, now abandoned.

CROSS REFERENCE TO RELATED PATENT APPLICATION

U.S. patent application Ser. No. 07/472,349, filed Jan. 30, 1990 (F. VAN DEN DOOL et al) and U.S. patent application Ser. No. 07/591,699, filed Oct. 2, 1990 (Dick Brandt).

A. BACKGROUND To THE INVENTION

1. Field of the invention

The invention relates to a method for monitoring, by means of a monitoring device, a downstream transmission medium which comprises a multiplicity of virtual, asynchronously time-shared transmission channels via which a data flow fed into said transmission medium can be transmitted, which data flow is composed of data cells which are each transmitted via one of said transmission channels and which each comprise a control word group ('header') containing one or more control words and also an information word group containing one or more information words, which control words are read out in the monitoring device; at least one variable being maintained, in addition, in the monitoring device, which variable is mutated on arrival of a data cell in accordance with a mutation algorithm containing one or more mutation parameters and said mutated variable then being processed to form an assessment signal in accordance with an assessment algorithm containing one or more assessment parameters.

2. Background of the Invention

Such a method is disclosed, inter alia, by the U.S. patent application Ser. No. 07/472,349. According to the known method, one variable is maintained per transmission channel, namely a counter position value which is incremented on the arrival of a data cell and is compared with a threshold, after which said data cell is transmitted to the downstream transmission medium if the counter position value is less than the threshold or is not transmitted if the counter position is higher than, or equal to, the threshold. According to the known method, only one variable is therefore incremented and processed (evaluated) to form one assessment signal which is then used directly as a control signal which determines whether or not a data cell is transmitted.

B. SUMMARY OF THE INVENTION

The present invention expands and improves the known method, namely by providing for the incrementation or decrementation of a number of variables and the processing thereof to produce a number of assessment signals which are then converted by further processing into a control signal that is used to accept or not accept data cells. In other words, the present invention provides a method as specified under A. which is characterized in that a number of variables can be incremented or decremented and processed to form a corresponding number of assessment signals as mentioned in the monitoring device on arrival of a data cell, and furthermore, in that, for each data cell, the said control word group comprises a control word which, on arrival of a data cell, is read out in the monitoring device and which gives an indication of those variables which have to be incremented or decremented, i.e. altered arithmetically in numerical magnitude (hereinafter referred to simply as altered in magnitude) and then processed and likewise an indication of the magnitude alteration and assessment algorithms to be used in doing so.

The invention therefore achieves the result that, for every virtual transmission channel, a control signal is formed which does not have to be based, as in accordance with the known method, solely on one variable, one magnitude alteration algorithm and one assessment algorithm, but can be based on more variables and more magnitude alteration and assessment algorithms, the variables and algorithms to be used being derived from one of the control words of the data cell appearing at the monitoring device. Different algorithms can be made use of for each virtual channel. Furthermore, the invention makes provision, in addition, that one or more of the said assessment signals is processed according to a combination algorithm containing one or more combination parameters to form a control signal and furthermore that, for each data cell, the said control word group comprises a control word which, on arrival of a data cell, is read out in the monitoring device and which gives an indication of those assessment signals which have to be processed and the combination algorithm to be used in doing so. In other words, the control signal does not correspond directly, as according to the known method, with the result of the processing of the (only one) magnitude altered variable in the assessment algorithm, the assessment signal, but a further processing takes place on each of the assessment signals according to a combination algorithm, the assessment signals to be used for this being indicated by one of the control words of the header of the data cell appearing at the monitoring device.

According to the invention it is also possible to form not only one control signal, but more, namely by processing the assessment signals or a selected section thereof not according to one, but according to a variety of combination algorithms, the assessment signals and combination algorithms to be used in doing so being indicated by one of the control words of the header of the data cell appearing at the monitoring device.

If desired, according to the invention, the various parameters to be used in the various said algorithms—all or a selected part thereof—can also be indicated by one of the control words of the header of the data cell appearing at the monitoring device.

It is pointed out that, as mentioned, the variables, their magnitude assessment, the assessment and combination parameters to be used, and also the various parameters are indicated, for example, by control words from the control word group (header) and by means of so-called pointers which indicate a particular position in a table concerned.

As a result of its great flexibility, the invention offers a number of application possibilities which the known method does not offer; a number of these will be dealt with in more detail under E. Among other things, the invention offers the possibility of monitoring not only individual users but also user groups or user categories.

The invention comprises, in addition to the method dealt with above, also a device for implementing the method. The device according to the invention is characterized by a reading unit to which the data cells are presented for reading out at least the control words (the header) of said data cells, a setting means for setting, on the basis of the data read out in the reading unit, which variables, or algorithms, or parameters have to be used for generating the control signal, furthermore a number of magnitude alteration means for altering the respective variables indicated by the setting means and also a number of assessment means for processing the respective altered variables to produce the respective assessment signals, one or more combination units for combining the assessment signals concerned to form one or more control signals, and a switching unit for temporarily storing the contents of the data cell and transmitting or not transmitting the data cell downstream depending on the control signal concerned. These various means mentioned above can advantageously be combined in what may be called 'policing criterion chip' (PCC), being a VLSI implementation of the magnitude alteration means and the assessment means in conformity with those means as presented in the cross referenced U.S. patent application Ser. No. 07/473,349, a number of which PCCs can be used with a common input look-up table (ROM), a common input latch for incoming index data, and a common output correlator.

C. REFERENCES (In Addition to Cross-References Already Listed)

Denissen, F.; Desmet, E.; Petit, G. H., "The Policing Function in an ATM Network", 1990. International Zurich Seminar on Digital Communications, Electronic Circuits and Systems for Communications, Proceedings I.E.E.E. (Cat. No. 90TH0305-3) x+511 pp., pp. 131-44, 1990.

D. DRAWINGS

Figure 2:
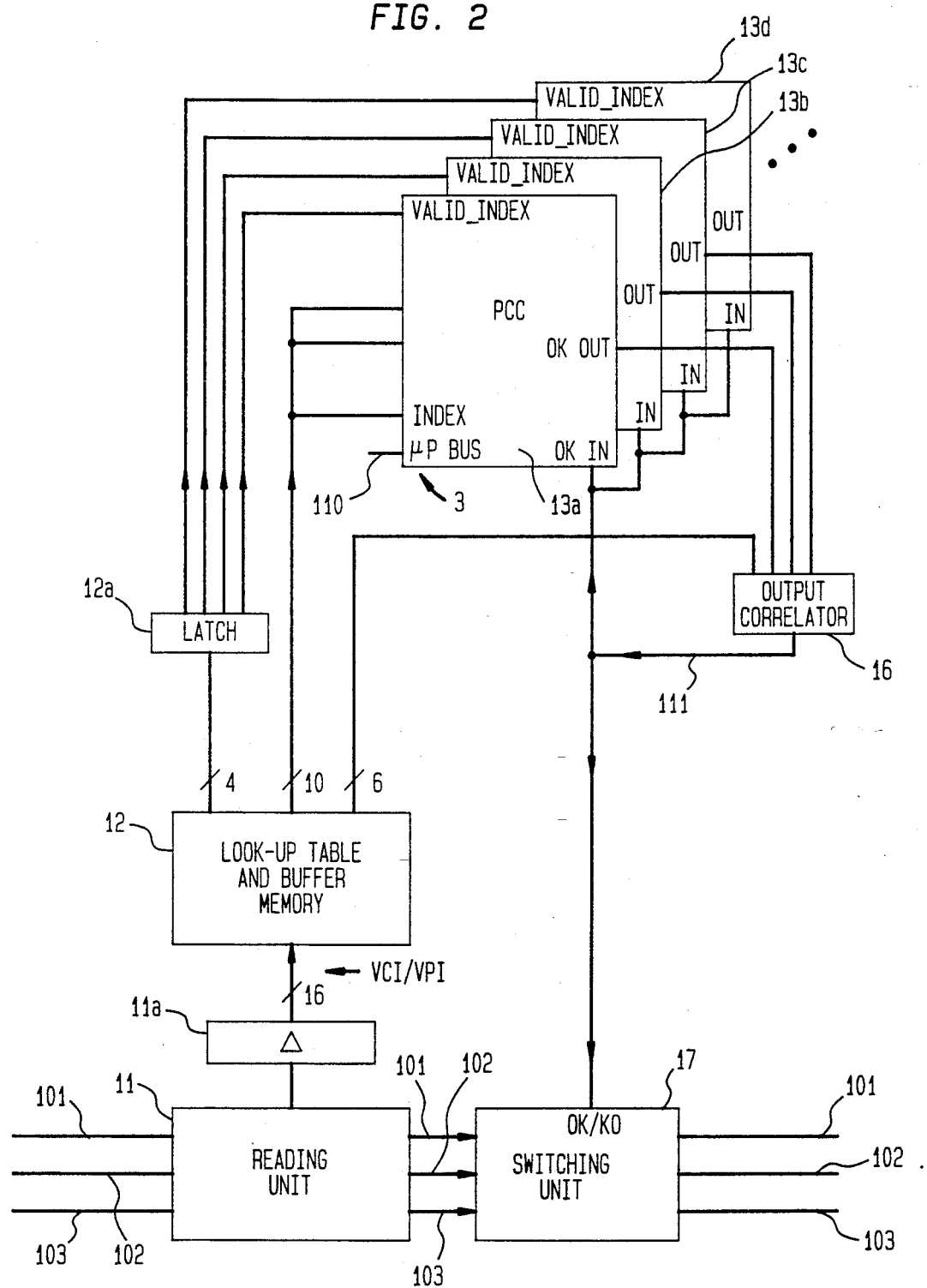

FIG. 1 is a highly schematic diagram of apparatus for implementing the method of the invention, simplified for facilitating a detailed description of the method, and FIG. 2 is a circuit block diagram of an illustrative embodiment of the apparatus represented by FIG. 1.

E. EXEMPLARY EMBODIMENTS

FIG. 1 shows diagrammatically an exemplary embodiment of the invention, that is to say, of a device for implementing the method according to the invention.

The device comprises a reading unit 1 for reading the control words from the 'header' of data cells (which furthermore contain information words) presented to said reading unit 1. From the control words the (virtual) transmission channel, and possibly the user or user group and/or category, to which the data cell belongs is deduced. Furthermore, the control words which relate to the actual operation of the FIG. 1 device in the generation of a control signal c which is presented to a switching unit 7 are read out in the reading unit 1. In the switching unit 7, the contents of the data cell are temporarily stored until the control signal c is emitted and—depending on the (binary) value of said signal c—the switching unit 7 transmits or, for example, if the presentation of data cells per unit time of the transmission channel concerned or of the user or user group concerned is too great—is not transmitted but removed so that the downstream transmission medium is not overloaded or disproportionately loaded with data cells of the type concerned. However, it is also possible not to deduce the factors which (lacuna) the actual operation of the device from control words specially intended for the purpose, as was proposed above, but to derive them instead from the other data derived from the control words concerned, such as, for example, the transmission channel designation or one or more of the other data mentioned.

On the basis of the data read out in the reading unit 1, the setting unit 2 sets (i.e. selects and temporarily stores) which variables—belonging to said virtual transmission channel, said user, user group, category, etc.—have to be used to generate the control signal c. Furthermore, the setting unit 2 deduces on the basis of the data read out, and sets the manner in which (according to which algorithms and parameters to be used therewith) the respective variables have to be altered in magnitude and also the manner in which the various altered variables have to be processed to form respective assessment signals; finally the manner in which the various assessment signals have to be combined in the output correlator 6 to form a control signal c which controls the switching unit 7 is also set. In this connection, it may be the case that one variable or a plurality of variables has or have to be altered in magnitude and processed further for each transmission channel etc.; for example, one variable may represent the average number of data cells in the short term and a second variable may represent the average number in the long term. In this manner, one or more (statistical) characteristics can be maintained which are of importance for assessing whether data cells can be transmitted to the downstream transmission medium or not, if desired for each transmission channel and/or user, user group, category etc.

The variables, algorithms and parameters specified by the setting unit 2—on the basis of the control words—are presented to a number, required for the purpose, of simultaneously operating processing units 3 (a, b, c, etc.), which may be PCC chips and which each perform a magnitude alteration function, represented by units 3 (a, b, c, etc.) in FIG. 1 and an assessment function, represented by units 5 (a, b, c, etc.) in FIG. 1.

In the magnitude alteration function of a PCC chip or of a unit 4 the variables specified by the setting unit 2 are read out from a table and then altered according to a magnitude alteration algorithm. That algorithm may be one of an available plurality; in that case, the setting unit 2 specifies which algorithm has to be used. Parameters to be used in the magnitude alteration can also be indicated and looked-up by in setting unit 2 by means of a stored table, after which the looked-up parameter values are used during the magnitude alteration.

In the assessment function of a PCC chip or of a unit 5, the variables altered by the respective preceding alteration are processed according to an assessment algorithm. For example, the average value of one variable may be monitored (assessed) over a short time period in the assessment unit 5a, the average value of a second variable over a longer period in the assessment unit 5b and the variance of a third variable in the assessment unit 5c. From these variables, of which, for example, the first and the second relate to the transmission channel concerned and the third to the user group concerned, it is determined whether they do or do not exceed a threshold. The setting unit 2 indicates which algorithm has to be used. The setting unit 2 can also indicate the parameters to be used in the assessment in a table, after which the parameter values are used in the assessment of the already altered variable.

The operations carried out in the various processing units 3 produce equally as many assessment signals b which each, as for example mentioned, indicate whether a certain value will be exceeded if the data cell—which is still in the switching unit 7—is transmitted, as a result of which the downstream transmission network will be improperly loaded—to a serious or less serious degree. The various separate assessment signals b are combined in accordance with a combination algorithm in an output correlator 6. In the correlator 6, on the basis of the assessment of the consequences of transmitting the data cell according to several criteria, each thereof being carried out in the several processing units 3, a definitive control signal c is generated which activates the switching unit 7 to either transmit the data cell stored therein to the downstream transmission network or not to transmit ("discard") the data cell. Although it is possible—just as in the magnitude alteration and assessment operation—to make use of a single algorithm programmed therein, use can preferably be made of one of a plurality of algorithms, the choice of which is indicated by the setting unit 2 which also derived this item of data beforehand from the control word group of the data cell. The parameters to be used in the output correlation algorithm are also designated by the setting unit 2, for example by use of a table containing possible parameter values from which the setting unit 2—by means of a "pointer"—makes a choice in the same way as that in which the parameters are generated for the other algorithms.

In FIG. 1 the various setting signals—for setting and selecting the indicated variables, algorithms and parameters specified by the control word group of the data cell—originating from the setting unit 2 are all designated in the connecting line by "i", the various assessment signals by "b" and the (final) control signal by "c".

However, it is also possible that more than one control signal is generated in the output correlation unit 6, the various control signals then controlling, for example, various switching units 7, each having its own function.

It is furthermore pointed out that, during the monitoring of the (statistical) characteristics mentioned for each transmission channel and/or user, user group etc., either all the data cells (belonging to said transmission channel or said user, user group etc. respectively) arriving at the monitoring device are included, that is to say regardless of whether or not they are transmitted by the monitoring device, in this case the switching unit 7, or (only) the data cells which are transmitted by the switching unit 7 are included. A combination of those two options is also possible, i.e. that in one processing unit 3 all the data cells arriving are included in the calculation, while in another processing unit 3 only the data cells transmitted are involved in the calculation: the one assessment signal b then relates, for example, to the average number of data cells of a particular user group arriving, while the other assessment signal relates to the average number of data cells of said user group transmitted. In order to realize these options, a feedback facility is provided in the device between the control unit 6 and each of the magnitude alteration portions 4 of the processors 3. If the setting unit 2 deduces from the control word concerned of the data cell that, in a particular processing unit, for example $3b$, account only has to be taken of the data cells insofar as they are transmitted by the switching unit 7, that is specified in the setting signal i to the processor $3b$. If the control signal c is such that the data cell has to be transmitted by the switching unit 7, the altered value of the variable concerned is then stored in the alteration portion of the processor 3 as the variable which has to be taken into account on a subsequent occasion as the initial value; if, on the other hand, the control signal c is such that the data cell must not be transmitted by the switching unit 7, the altered variable is not stored in the processor $3b$ so that on a subsequent occasion account is taken of the original variable as the initial value. In FIG. 1 this feedback is indicated by the control signal c which is presented to each of the processors 3. Whether a magnitude alteration operation does in fact make use of the feedback signal c, is therefore determined by the setting signal concerned which is derived by the setting unit 2 from the control word group of the data cell. If account has to be taken in a magnitude alteration operation of all the data cells (belonging to said transmission channel, said user, user group etc.) which present themselves to the device—that is to say, whether they are transmitted or not—it is not necessary to make use of the feedback (control) signal; in all cases, the altered variable is stored as a new variable value in the processor 3, regardless of whether the data cell is transmitted or not.

It is also shown in FIG. 1 that the setting unit 2 can be activated not only by the control words from the data cells which appear at the reading unit 1 but also(for example additionally) from other parts of the transmission network. In FIG. 1 such an external signal which (also) sets the setting unit 2 is designated by "e".

FIG. 2 shows an implementation of the system of FIG. 1 using PCC chips.

In FIG. 2 each of the processors $3a$, $3b$, $3c$, $3d$, ... are replaced by PCC chips. Each PCC chip contains calculation means for doing the necessary incrementing or decrementing of and with count values described above in connection with FIG. 1 and also contains a random access memory of 45 kilobits. It may have a microprocessor interface connecting to a common microprocessor not shown in FIG. 2 for serving all of the PCC chips.

The "leaky bucket" algorithm is the most commonly used one and the best known in the art of automatic data cell (or packet) traffic control. In this algorithm a certain long-term average cell rate is allowed (the leak in the bucket). The momentary cell rate is permitted to exceed the allowed average up to a certain number of cells (the bucket's contents). When the credit is used (i.e. the bucket is full), no more cells are passed to the network until the bucket's contents has leaked away sufficiently.

The parameters and variables necessary for each index to perform the leaky bucket criterion calculations are as follows. First, there is the RESOLUTION, which is a coding of three parameters, LEAK_AMOUNT, CLOCK_RESOLUTION and LEAK_ENABLE. LEAK_AMOUNT & CLOCK_RESOLUTION are used to achieve the required resolution (the number of bits of a count state that will be used) in the criterion calculation, considering the cell rate generated by each index. LEAK_ENABLE indicates whether or not the bucket should leak at all. Another parameter is the MOMENT_OF_LAST_TRANSFER, which is a variable expressed conveniently in 10 bits. Other parameters are the SPLASH_AMOUNT (incrementing step size) which may be expressed in eight bits for example, the BUCKET_LIMIT, a parameter which can be expressed in thirteen bits but as a practical matter convenience may require storing of only the eight most significant bits, so that the real value of BUCKET_LIMIT is found by adding five zeroes to the least significant side, and finally the BUCKET_LEVEL, which may likewise be expressed in thirteen bits.

A slot counting function is required to calculate the elapsed time between the arrival of cells. This may conveniently has eighteen bits, not all of which may be needed in any particular calculation, according to the resolution required by the algorithm. The slot counter may be a counter or count register relating to a particular virtual channel produced by time division or relating to a group of particular virtual channels used by one or more customers. A virtual channel may be produced by time division, into so called time slots, in a physical channel defined by an electrical or optical conductor or a high frequency carrier wave guided therein or radiated in free space.

The sequence of steps listed below as Tabele 1 is a procedure example for the operation of a PCC chip which is the equivalent of a flowchart of a computer program. The table is for the "leaky bucket" control algorithm.

TABLE 1

PROCEDURE FOR LEAKY BUCKET (EXAMPLE)

```
BEGIN
Read (Index);
(RESOLUTION,SPLASH_AMOUNT,BUCKET_LIMIT,
DISCARDED_CELL,
MOMENT_OF_LAST_TRANSFER,BUCKET_LEVEL) :=
RAM[Index];
IF RESOLUTION = 255
THEN
  LEAK_ENABLE := 0;
  CLOCK_RESOLUTION := 0;
  LEAKE_AMOUNT := 0;
ELSE
  LEAK_ENABLE := 1;
  IF RESOLUTION <= 8
  THEN
    CLOCK_RESOLUTION := RESOLUTION;
    LEAKE_AMOUNT := 0;
  ELSE
    CLOCK_RESOLUTION := 0;
    LEAKE_AMOUNT := RESOLUTION - 8;
  ENDIF
ENDIF
Read (SLOT_COUNTER);
MOMENT_OF_ARRIVAL :=
SLOT_COUNTER >> CLOCK_RESOLUTION;
ELAPSED_TIME := MOMENT_OF_ARRIVAL -
MOMENT_OF_LAST_TRANSFER;
LEAK_AMOUNT := (ELAPSED_TIME <<
LEAKE_AMOUNT) * LEAK_ENABLE;
BUCKET_LEVEL := Max(BUCKET_LEVEL -
LEAK_AMOUNT,0);
OK_KOout := (BUCKET_LEVEL < BUCKET_LIMIT);
Write (OK_KOout);
Read (OK_KOin);
IF OK_KOin
THEN
  BUCKET_LEVEL := Min(BUCKET_LEVEL +
  SPLASH_AMOUNT, BUCKET_LEVELmax)
ELSE
  DISCARDED_CELL := 1
ENDIF
MOMENT_OF_LAST_TRANSFER :=
MOMENT_OF_ARRIVAL;
RAM[Index] := (RESOLUTION,SPLASH_AMOUNT,
BUCKET_LIMIT,DISCARDED_CELL,
MOMENT_OF_LAST_TRANSFER,BUCKET LEVEL);
END;
```

The admission of data cell traffic for transmission in time division channels in accordance with the invention is not limited to the use of the leaky bucket criterion and typically may use one or more than one policing criterion at the same time. Thus several varieties of the leaky bucket criterion or other criterions can be used, relating to short time load as well as the overall long time load. The leaky bucket criterion or criteria can be used along with other types of criteria such as "exponential leak", "moving window", "jumping window" or "gabarit" criteria. Even it is possible to simulate the effect of the latter criteria with a combination of several 'leaky buckets', set with different parameters. Said other types of criteria are described in a publication by F. Dennissen, E. Desmet and G. H. Petit. For example the gabarit function is based on the mean and standard deviation of a source's Gaussian envelope and has been developed for optimal exploitation of the statistical multiplexes and gain for variable bit rate sources by guaranteeing not only the negotiated mean cell rate but also the negotiated variance for the policed connection. The parameters of the gabarit policing function can directly be used by a statistical connection acceptance control algorithm. The main advantages of the gabarit policing function are simplicity of the parameters used, no implementation complexity, flexibility, and application to a wide range of source types, for example, variable rate sources, continuous bit rate sources and bursty sources.

FIG. 2 shows the reading unit 11 and the switching unit 17 corresponding to the units 1 and 7 of FIG. 1. The channels 101, 102, 103 may be virtual channels (e.g. time division channels) or physical channels, and in general there will be a large number of them, with only three shown in FIG. 2 for reasons of simplicity. The output of the reading unit after being amplified in the amplifier (latch) 11a goes to the setting unit 12 which contains a look-up table and a buffer memory and has a latch 12a on some of its output, in this case outputs which provide a one-bit signal to each of the PCCs 13a, 13b, 13c and 13d shown in FIG. 2 to indicate whether a valid index has been received for the particular PCC, which is a prerequisite for activating the PCC. The actual index and certain other data are supplied to the data inputs of the respective PCCs (shown only for the PCC 13a). FIG. 2 shows a connection 110 to a microprocessor bus which connects the PCCs to a microprocessor (not shown). The assessment signal output is marked OKout and goes to the output correlator 16, which has a first output 111 for actuating the switching unit 17 and for providing a OK return signal to each PCC at its OKin input. The output correlator has a six bit input in the illustrated case which is supplied from the look-up table and buffer memory portion of the setting unit 12, 12a, for controlling that correlator 16.

The look-up table contains all the necessary parameters or settings for each data cell header type. The assessment operation in the PCC chips proceeds in the manner shown in co-pending U.S. patent application Ser. No. 07/472,349, with the use of a threshold memory and a comparison operation. On the arrival of a data cell various load indicators can be computed. For instance, the data cell header, read out in the unit 11 controls a pointer or address in the look-up table of the unit 12, resulting in setting a number of parameter values in its buffer memory. Some parameters may, for example, indicate that PCC 13a will be used to generate a short term assessment signal for a data cell channel to which the data cell belongs, to be computed by the leaky bucket algorithm. The various memories needed for the magnitude altering operation (which are the memories 3, 5, 7 and 9 of the said co-pending application) are set to their starting values and are used to compute the new channel count values. A threshold memory is similarly set and the new channel count is compared with that threshold, resulting in a first one-bit assessment signal which goes to the output correlator 16. From the look-up table of the unit 12, for example, the determining processor unit 13b may be set to generate a second, long term channel assessment signal. Its memories, however, can be set at values different from those of the processor 13a, and the processor 13b would likewise produce a one-bit assessment signal. In the same way the processing unit 13c may be used for generation of a one-bit assessment signal relaying to the load of a certain group of channels ("user group"). In this case, the memories of the processing unit 13c are set to values which relate to that particular user group.

Although the invention has been described with reference to particular illustrative examples, it will be recognized that variations and modifications are possible within the inventive concept.

I claim:

1. Method for monitoring, by means of a monitoring device, a downstream transmission medium which comprises a multiplicity of virtual, asynchronously time-shared transmission channels via which a data flow fed into said transmission medium can be transmitted, which data flow is composed of data cells which are each transmitted via one of said transmission channels and which each comprises a control word group containing one or more control words and also an information word group containing one or more information words, which control words are read out in the monitoring device, said monitoring device comprising means for performing the method steps of maintaining at least one variable, and of altering said at least one variable in magnitude, in response to arrival of a data cell, in accordance with a magnitude alteration algorithm containing one or more alteration parameters, followed by the steps of processing said altered variable to form an assessment signal in accordance with an assessment algorithm containing one or more assessment parameters, characterized in that a number of variables are altered and processed to form a corresponding number of assessment signals as aforesaid in the monitoring device in response to arrival of a data cell and in that, for each data cell, the said control word group comprises a control word which, when read out as aforesaid in the monitoring device, designates those variables which are to be altered and processed and also the alteration and assessment algorithms to be used in doing so.

2. Method according to claim 1, characterized in that a plurality of said assessment signals are processed in said monitoring device in accordance with an algorithm, containing one or more combination parameters, for logically combining said plurality of said assessment signals to form a control signal, and furthermore, in that, for each data cell, said control word group comprises a control word which, on arrival of a data cell in the monitoring device, is read out and designates the assessment signals which are to be processed as aforesaid and the algorithm to be used for logically combining said plurality of said assessment signals.

3. Method according to claim 1, characterized in that a plurality of said assessment signals are processed in said monitoring device respectively in accordance with a plurality of combination algorithms, each containing one or more combination parameters, for logically combining said assessment signals to form a corresponding number of control signals, and furthermore, in that, for each data cell, the said control word group comprises a control word which, on arrival of a data cell in the monitoring device, is read out and which designates the assessment signals which are to be processed and the respective algorithms to be used for logically combining said assessment signals.

4. Method according to claim 2, characterized in that, for each data cell, said control word group comprises a control word which, on arrival of a data cell in the monitoring device, is read out and which designates at least a part of the value of at least one said combination parameter relating to said algorithm for logically combining said plurality of said assessment signals.

5. Method according to claim 3, characterized in that, for each data cell, said control word group comprises a control word which, on arrival of a data cell in the monitoring device, is read out and which designates at least a part of respective values of at least two of the respective combination parameters relating to at least two of said algorithms respectively for logically combining said assessment signals.

6. Monitoring device having means for monitoring a downstream transmission medium which comprises a multiplicity of virtual, asynchronously time-shared transmission channels via which a data flow fed into said transmission medium can be transmitted, which data flow is composed of data cells which are each transmitted via one of said transmission channels and which each comprise a control word group containing one or more control words and also an information word group containing one or more information words, characterized by a reading unit (1) having means for reading out at least said control word group of each data cell fed to the monitoring device;

a setting unit (2) being connected to said reading unit (1) and having means for setting, on the basis of the contents of said control word group read out in the reading unit, one or more units to be mentioned hereafter;

a plurality of alteration units (4a,b,c, . . .) being connected to said setting unit (2) and having means for respectively altering the magnitudes of a plurality of variables to be maintained by the monitoring device, in accordance with on or more magnitude alteration algorithms and alteration parameters as set by the setting unit;

a plurality of assessment units (5a,b,c. . .) being connected to said setting unit (2) as well as respectively to said alteration units (4a,b,c. . .) and having means for processing said variables to be maintained by the monitoring device and thereby respectively producing a plurality of assessment signals (b) in accordance with one or more assessment algorithms and assessment parameters as set by the setting unit;

at least one combination unit (6) being connected to said setting unit (2) as well as to said assessment units for producing a control signal (c) in accordance with an algorithm set by the setting unit, for logically combining said plurality of said assessment signals;

a switching unit (7) being connected to said combination unit (6) and having means for temporarily storing the contents of said data cell fed to the monitoring device and for transmitting or not transmitting that data cell depending on the control signal as produced by the combination unit.

* * * * *